June 28, 1927.

W. F. GROENE 1,633,633

CRANK SHAFT LATHE

Filed June 13, 1924

Inventor
WILLIAM F. GROENE,

Murray M Gugelter
Attorney

June 28, 1927. 1,633,633
W. F. GROENE
CRANK SHAFT LATHE
Filed June 13, 1924    8 Sheets-Sheet 2

Inventor
WILLIAM F. GROENE.

By Murray and Gugelter

Attorneys

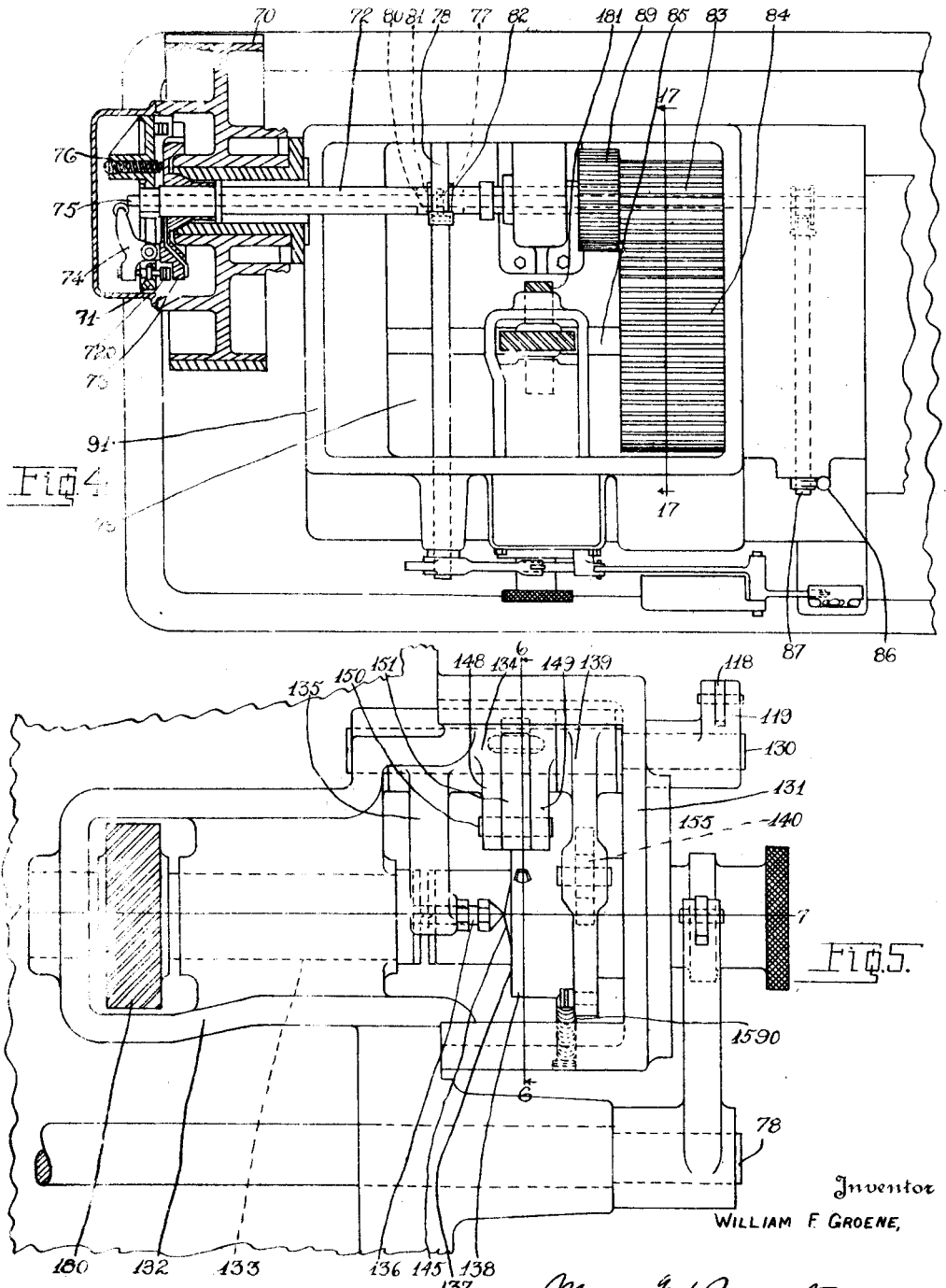

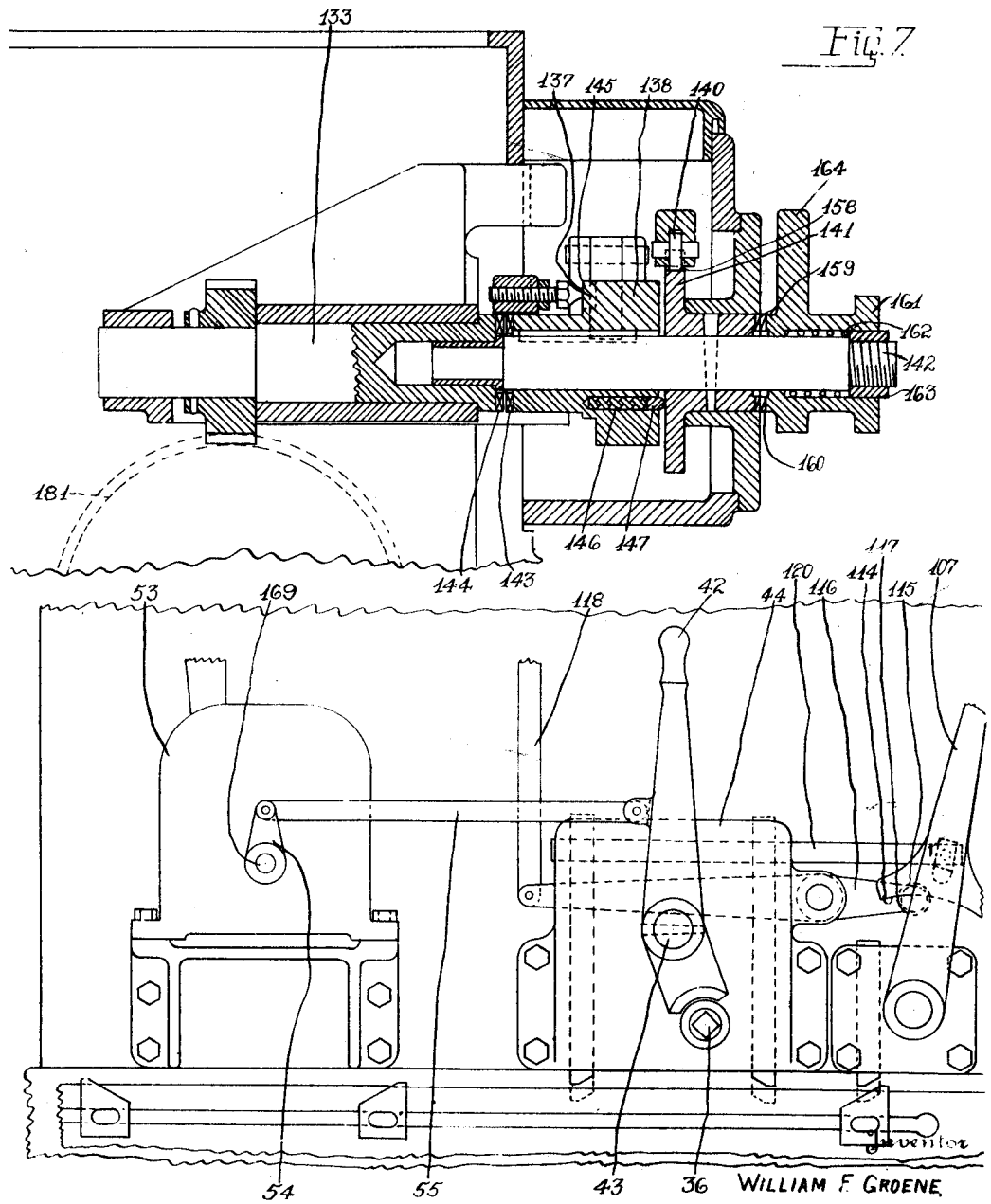

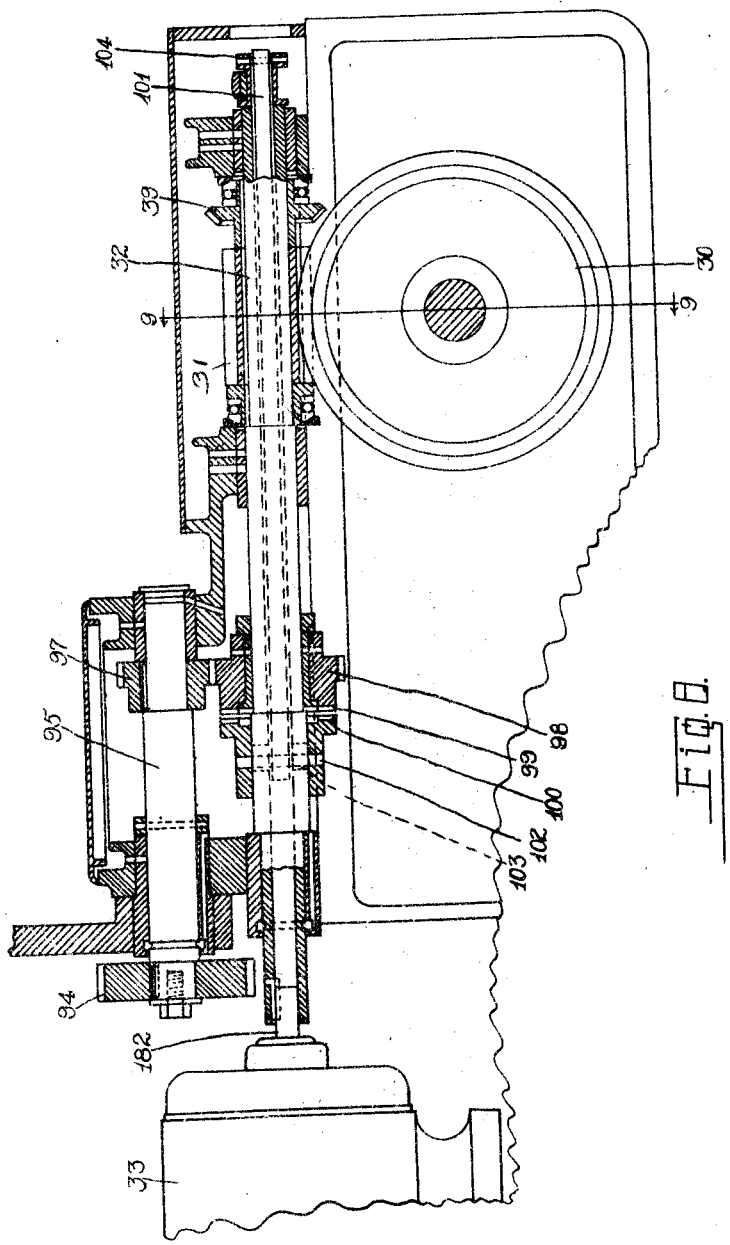

June 28, 1927.
W. F. GROENE
1,633,633
CRANK SHAFT LATHE
Filed June 13, 1924  3 Sheets-Sheet 6
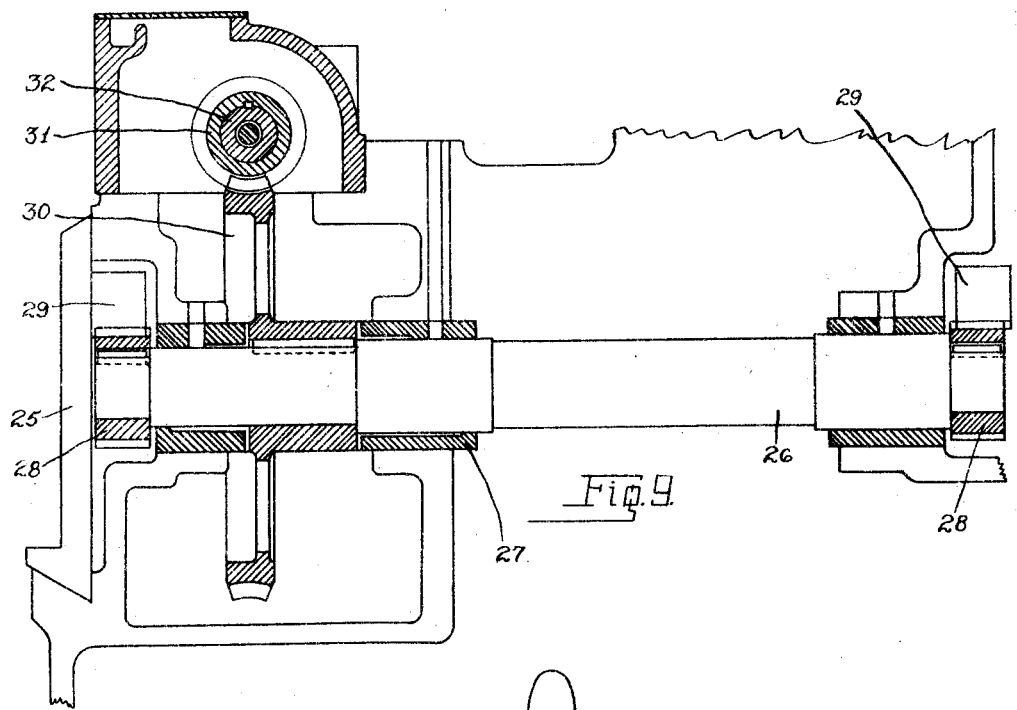
Fig. 9.
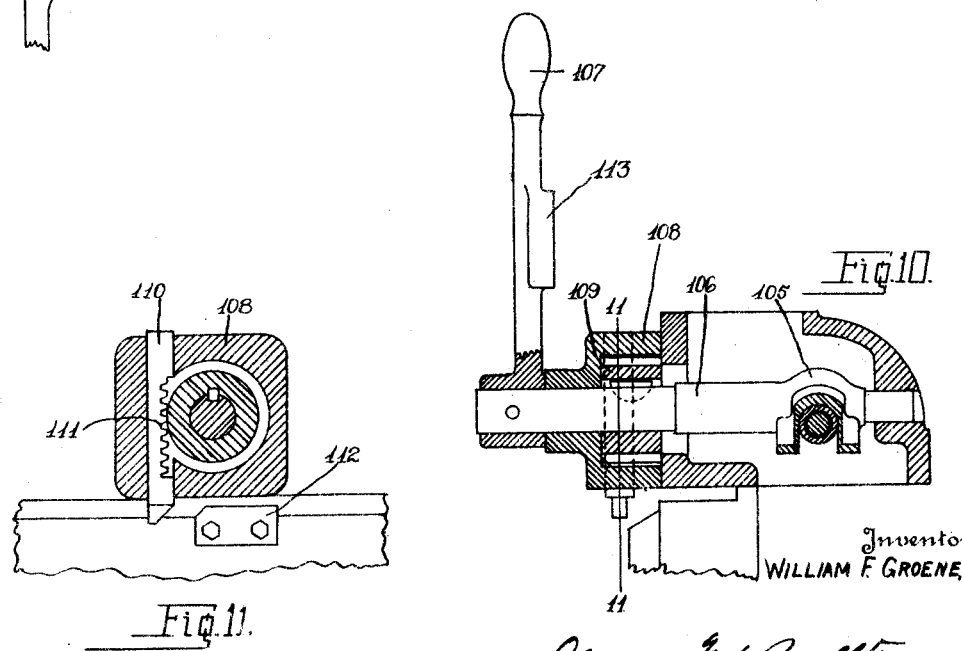
Fig. 10.
Fig. 11.
Inventor
WILLIAM F. GROENE
By Murray and Zugelter
Attorneys

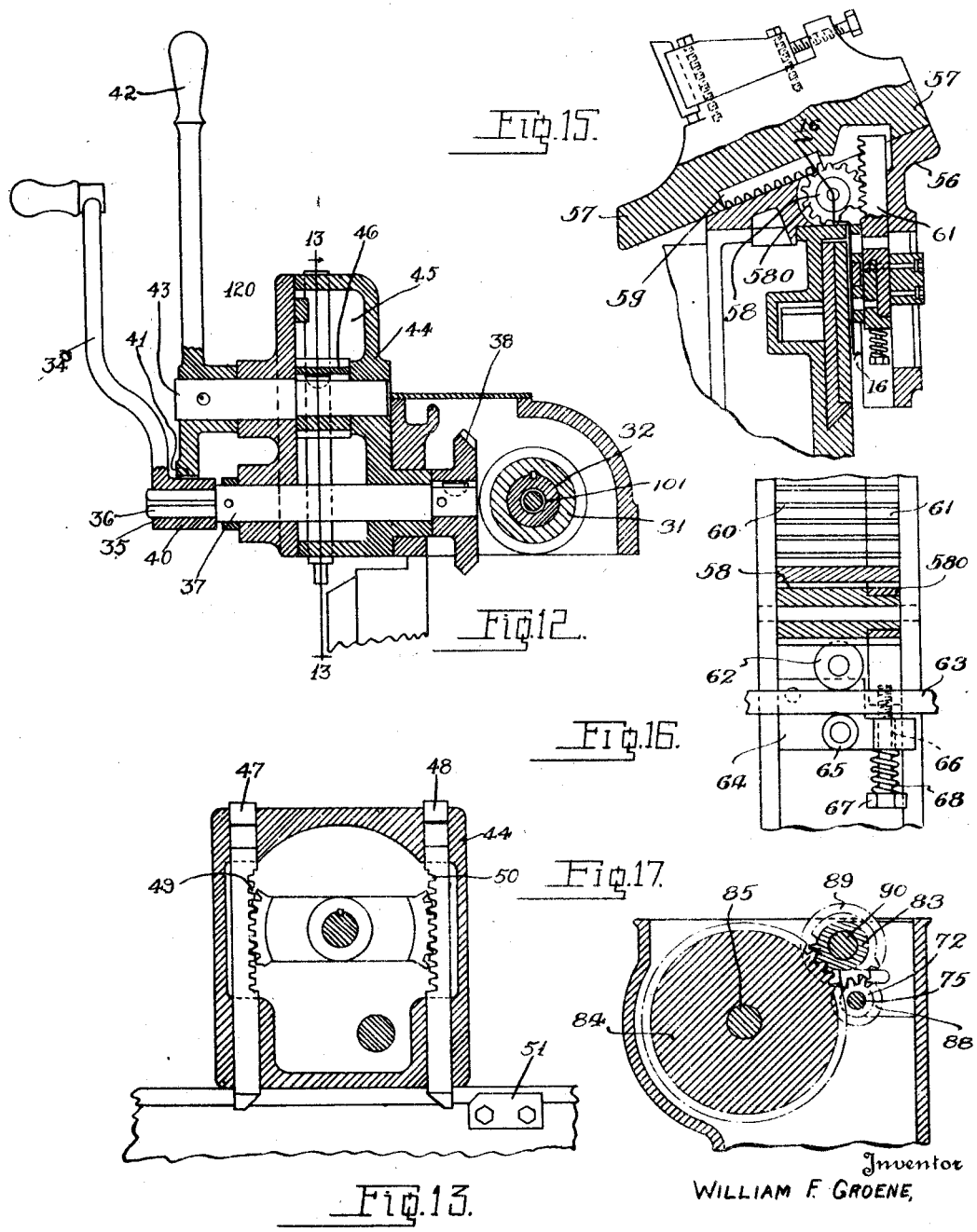

June 28, 1927.

W. F. GROENE 1,633,633

CRANK SHAFT LATHE

Filed June 13, 1924

Inventor
WILLIAM F. GROENE,
By Murray & Gugelter
Attorneys

Patented June 28, 1927.

1,633,633

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

CRANK-SHAFT LATHE.

Application filed June 13, 1924. Serial No. 719,906.

An object of my invention is to provide a crank shaft lathe that will be automatic in its work of turning a crank shaft, and of then returning the parts to position for operating upon another article of the same kind.

Another object of my invention is to provide a simple and efficient device for the purpose stated.

Although my invention is disclosed as applied to a lathe generally referred to as a crank shaft lathe, it will be readily evident that same may be applied to other machine tools without restriction to crank shaft lathes.

The foregoing, and other objects are attained by the means described herein, and disclosed in the accompanying drawings, in which:

Fig. 4 is a plan view, parts shown in section, of parts of the drive mechanism, forming details of my invention.

Fig. 5 is a fragmental enlargement of parts shown in Fig. 4.

Fig. 7 is a sectional view on line 7—7 of Fig. 5.

Fig. 8 is an enlarged sectional view on line 8—8 of Fig. 2.

Fig. 9 is a sectional view on line 9—9 of Fig. 8.

Fig. 10 is an enlarged sectional view on line 10—10 of Fig. 1.

Fig. 11 is a sectional view on line 11—11 of Fig. 10.

Fig. 12 is an enlarged sectional view on line 12—12 of Fig. 1.

Fig. 13 is a sectional view on line 13—13 of Fig. 12.

Fig. 14 is an enlarged detail elevation of a fragment of the structure shown in Fig. 1.

Figure 1:
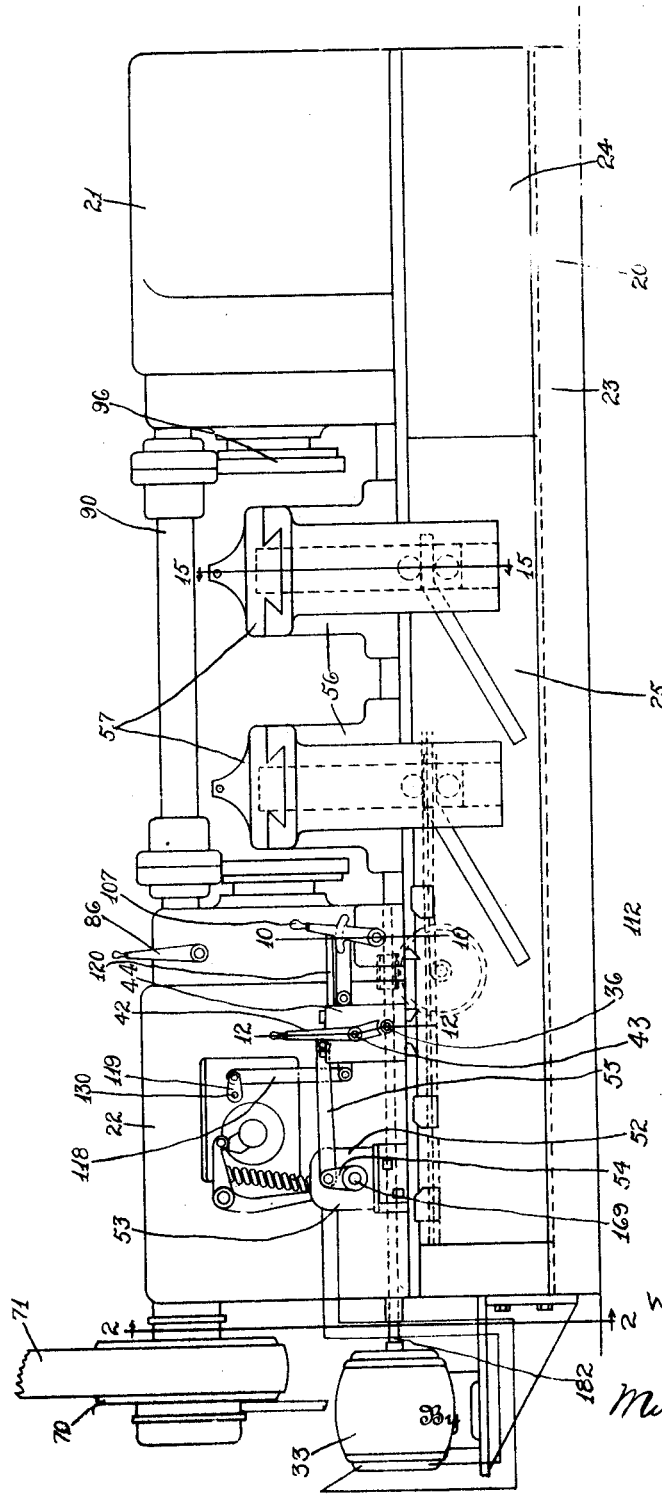
Fig. 1 is a front elevation of a device embodying my invention.

Portions of the structure disclosed herein are substantially the same as shown in my co-pending application, Serial No. 627,175, filed March 23, 1923. The structure disclosed herein comprises a bed 20 provided with a tail stock 21, and a head stock 22. The bed has formed along its front and rear faces 23, ways 24, that slidably receive a reciprocating carriage 25. Structures comprising a reciprocating carriage such as 25 may be provided on both sides of the lathe, and would be substantially identical in structure, wherefore the description of one will suffice for both. The carriage 25 may be reciprocated longitudinally of the bed, in any suitable manner, for example as shown in Fig. 9. The lathe bed supports a revoluble shaft 26 that may be mounted on suitable bearings 27 carried by the lathe bed. The ends of the shaft 26 carry spur gears 28 that engage racks 29 carried upon the inner faces of the carriages or slides 25. The shaft 26 may be rotatably actuated by any suitable means, for example the worm wheel 30 driven from worm 31, mounted on shaft 32. The shaft 32 may be power actuated from the auxiliary motor or driving means 33 or may be manually operated by means of the crank 34, see Fig. 12. Normally the crank 34 would be detached for reasons that will be explained hereafter. The crank 34 is provided with an angular bore 35, as shown herein, a square bore, adapted to receive the complementary end 36 formed on the shaft 37. The shaft 37 is revolubly supported by a casing 44, which casing is carried by the bed, and at its inner end carries a bevel gear 38. The gear 38 engages the bevel gear 39 mounted on the tube shaft 32. In order to preclude injury to an operator, resultant from the rotation of the crank 34, when the shaft 32 is power actuated, the crank 34 is provided with a cylindrical hub 40 that may be received in the arcuate seat 41 formed in the lower end of the lever 42. The lever 42 controls the application of power from the motor 33 to the tube shaft 32. By reference to Fig. 14, it will be evident that when the crank 34 is mounted upon the shaft 36, the hub portion thereof locks the lever 42 against movement about the axis of said lever 42 on its axis. The lever 42 is pinned to the shaft 43, which shaft 43 acts as the axis for lever 42. The shaft 43 extends through the chamber 45 formed within the casing 44, and carries a segmental gear 46.

The segmental gear 46 has gear teeth formed at diametrically opposed portions thereof. The gear sections engage reciprocating shafts 47 and 48 that extend through the casing 44 and have racks 49 and 50 formed on them. The lower ends of the shafts 47 and 48 extend from the casing 44 and may be engaged by lugs 51 adjustably mounted upon the slide or carriage 25. The engagement of the lugs 51 upon the tapered lower ends of the shafts 47 and 48 serve to actuate the shafts upwardly whereby to return the shaft 43 and the lever 42 to a neutral position. The lever 42 is connected to an electrical switch indicated generally at 52 in Fig. 1. The switch is contained within the casing 53 and a crank 54 disposed without the casing 53, controls the movement of shaft 169 forming part of the switch mechanism within the casing. The crank 54 is connected by means of the link 55 with lever 42. The referred to switch controls the motor 33. From the foregoing, it will be evident that the feed of the slide or carriage 25 is ordinarily controlled by the engagement of the lugs carried by the slide, upon the reciprocating shafts 47 and 48. Because of the interlocking features of the lever 42 and the crank 34, the crank 34 cannot be mounted upon the shaft 37 unless the lever 42 is in a neutral position. This interlocking feature precludes closing of circuits through the switch 52 when the crank 34 is mounted on the shaft 37.

Upon the lathe bed are mounted carriages 56 supporting tool holders 57. The carriages 56 are adjustable longitudinally of the bed and may be fixedly mounted in adjusted positions by any suitable means such as bolts and means associated therewith commonly employed for such purpose. The foregoing structure and the structure about to be described is preferably in conformity with the disclosures in my co-pending application, Serial Number 676,011, filed November 21, 1923. The lathe carriage carries revolubly mounted spur gears 58 and 580 that engage a rack 59 formed on the lower face of the tool support 57. The tool supports and the carriages 56 are provided with complementary dove-tailed structures as is common in the art. Each of the gears 58 and 580 is engaged by one of a pair of vertically reciprocating racks 60 and 61. The rack 60 carries a roller 62 at its lower end that engages the upper face of a cam bar 63 mounted on the slide 25. The lower end of the rack 60 also carries a pivotally mounted block 64 and which block carries a roller 65 that engages the lower face of the cam bar 63. The block 64 is provided with a bore 66 therethrough, and through which bore extends a screw 67. The screw 67 carries a spring 68 that has its opposite ends in abutment upon the head of the screw, and upon the lower face of the block 64. The upper end of the screw 67 engages and is carried by the lower end of the rack 61. From the foregoing, it will be evident that as the carriage 25 is reciprocated longitudinally of the bed, the tool holders 57 will be reciprocated in conformity with the contours of the cam bars 63. The upper ends of the cam bars extend in parallelism with the line of reciprocation of the carriage 25, wherefore after the tools have done all their work, and the rollers associated with the racks 60 and 61 reach the said parallel faces of the cam bars, the feed of the tool holders into the work will stop. From the foregoing, it will be evident that certain of the tool holders may continue to be fed after others have finished their work, whereby to permit all tools to finish their work simultaneously or in a predetermined order.

Means are associated with the devices whereby to correlate the movement of the carriage and the turning of the work between the head stock 22 and the tail stock 21.

Figure 17:
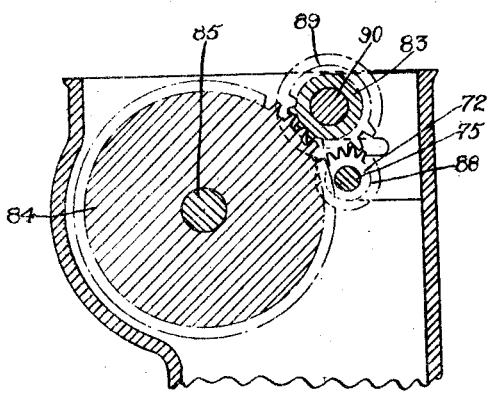
Fig. 17 is a sectional view on line 17—17 of Fig. 4.

In devices of this kind, although the structures at opposite ends of the lathe are referred to herein as head and tail stocks, both said end structures constitute driving heads for positively turning the work. The means for positively driving the spindles located upon the respective driving heads 21 and 22 will be explained at greater detail hereafter, however, it is pointed out at this time that the shaft 90 serves as a power transmitting means from driving head 22 to driving head 21. The means for driving the work or for turning work and for correlating the various elements will now be described. Attention is called to Figs. 1 and 4. The pulley 70 may be driven from any suitable source, for example by means of the belt 71. If desired motion may be transmitted to the pulley 70 from a motor mounted upon the head stock 22. The pulley 70 constitutes an element of a combined brake and clutch structure, shown in cross section in Fig. 4, and which structure may be of a type and form disclosed in my United States Letters Patent Number 1,474,112 of November 13, 1923. Briefly this structure comprises a tube shaft 72 that extends through the pulley 70 and carries a fixed friction disc 71 upon which friction rings 720, mounted for movement with the pulley 70, may be clamped by means of a reciprocating friction plate 73. The friction plate is moved to and from clamping engagement upon the friction rings 720 and friction discs 73, by means of fulcrumed levers 74 that are actuated by a shaft 75 contained within the bore of the tube shaft 72, and by means of springs 76 that yieldingly space the friction collar and friction disc. The tube shaft 72 is provided with an aperture communicating with the bore thereof, and through which aperture 81, a pin 77, carried by the shaft 75, extends. The pin 77 engages a collar 82 mounted upon the exterior of the shaft 72, and said collar is engaged by a fork 80 carried by the shaft 78. From the foregoing, it will be evident that rocking of the shaft 78 will serve alternately to move the clutch members associated with the pulley 70 into driving and braking positions. The headstock 22 has formed within it a gear chamber 79 and it is within this chamber that the engagement between the shafts 78 and 75 is effected. The tube shaft 72 carries a gear 88 that engages the gear 89 mounted on the shaft 90, see Fig. 17. The shaft 90 carries a gear 83 that engages a gear 84 mounted upon the spindle or shaft 85. The shaft 90 extends between the driving heads 21 and 22. The driving head 21 contains within it a chamber similar to the chamber 79 formed in the driving head 22 and within the chamber in driving head 21 are disposed gears similar to 83 and 84. The gear similar to gear 83 is mounted upon the shaft 90 and drives the gear similar to gear 84, said similar gear being associated with the spindle 96 associated with the secondary driving head 21. The shaft 75 may be manually reciprocated by means of a clutch lever 86, mounted on a shaft 87, that is connected to the shaft 75 in substantially the same manner in which the shaft 78 is connected to said shaft 75 for accomplishing reciprocation of the shaft 75. The shaft 78 constitutes part of an automatic control as distinguished from the manual control effected by the clutch lever 86 and its associated elements.

The shaft or spindle 85 extends through the side wall 91 of the chamber 79 and carries a gear 92 in mesh with an idler gear 93. The idler gear 93 engages the gear 94 mounted on the shaft 95. The foregoing train of gears are adapted to transmit motion from the primary driving means, or pulley 70, to the shaft 32 for feeding the carriage 25. The shaft 95 has mounted on it a gear 97 that engages a gear 98 revolubly mounted upon the tube shaft 32. The gear 98 has a clutch element 99 formed at its one end. A complementary clutch element 100 is pinned to the shaft 32 and to a reciprocating shift bar 101 contained within the tube shaft 32. From the foregoing, it will be evident that by manipulating the clutch comprising the clutch elements 99 and 100, the feed of the slide or carriage 25 may be controlled from the primary driving means or pulley 70. The clutch element 100 carries a pin 102 that extends through an aperture 103 formed in the tube shaft 32, said aperture being elongated and extending lengthwise of the tube shaft 32. From the foregoing, it will be evident that the clutch member 100 may be reciprocated longitudinally of the tube shaft 32. The shift bar 101 carries a spool 104. The spool is engaged by a yoke 105 carried by the shaft 106 extending forwardly from the bed, and which shaft carries a hand lever 107. The shaft 106 is received by a housing 108, within which housing is contained a gear 109, said gear being mounted upon the shaft 106. A reciprocating plunger 110 extends through the housing 108 and has a rack 111 formed thereon. The lower end of the shaft 110 extends downwardly from the housing 108 and may be engaged by a lug 112 adjustably mounted on the slide or carriage 25. The engagement of the lug 112 upon the shaft 110 serves to actuate the shift bar 101 longitudinally of the tube shaft 32, whereby to disengage the clutch members 99 and 100. The lever 107 has formed on it a cam 113 having an arcuate underface 114. An upwardly extending recess 115 is formed in the rear portion of the cam 113. A bar 116 is pivotally mounted upon the casing 44 and carries a roller 117 that engages the arcuate face 114, and may lodge in the recess 115. The bar 116 has its one end pivotally connected to one end of a link 118 extending upwardly from the bar 116. The upper end of the link 118 is pivotally connected to a crank 119, see Fig. 1, the object of which will be explained hereafter. A reciprocating bar 120 extends longitudinally of the lathe bed and extends through the casing 44. One end of the reciprocating bar 120 is pivotally mounted upon the lever 107. Sufficient play is provided between the pivotal mounting and the reciprocating bar 120 and the lever 107 to permit reciprocation of said bar as a result of the oscillatory manipulation of the lever 107. The reciprocating bar 120 has formed in it notches, complementary to the curvature of the shafts 47 and 48, and the shafts 47 and 48 have notches formed in them, complementary to the reciprocating rod 120, see Figs. 12 and 13. The purpose of providing the complementary notches is to permit locking of the shafts 47 and 48 against movement when the reciprocating bar 120 is in a given position and to permit movement of said shafts when the bar 120 is in a second position. The object of providing the said interlock is to preclude movement of the lever 42 from its neutral position when the carriage 25 is being driven from the primary driving means 70. When the clutch members associated with the tube shaft 32 are disengaged, the notches in the reciprocating rod 120 are so positioned that the shafts 47 and 48 may be reciprocated vertically, thereby permitting movement of the lever 42 and consequent closing of the circuit embracing the auxiliary motor 33 by means of the switch 52.

The upper end of the link 118 is connected with the crank 119 as previously explained.

Figure 6:
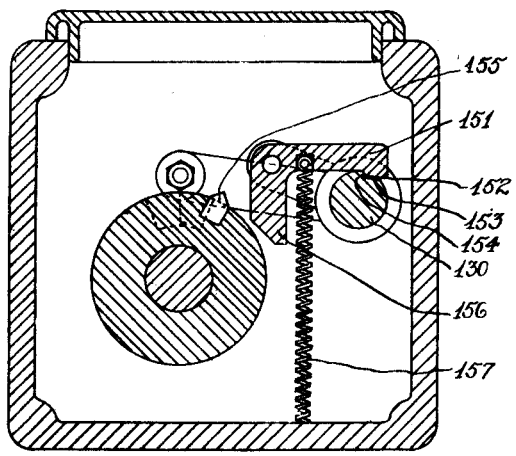
Fig. 6 is a sectional view on line 6—6 of Fig. 5.
Figure 16:
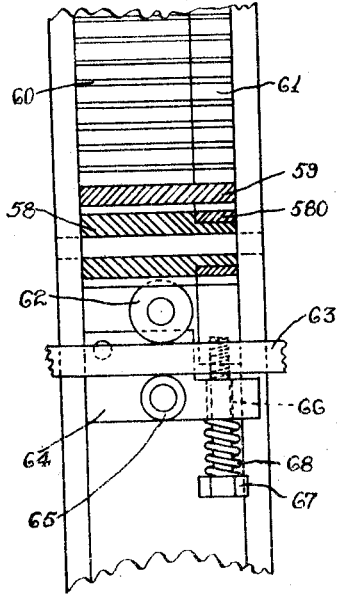
Fig. 16 is an enlarged sectional view on line 16—16 of Fig. 15.
Figure 15:
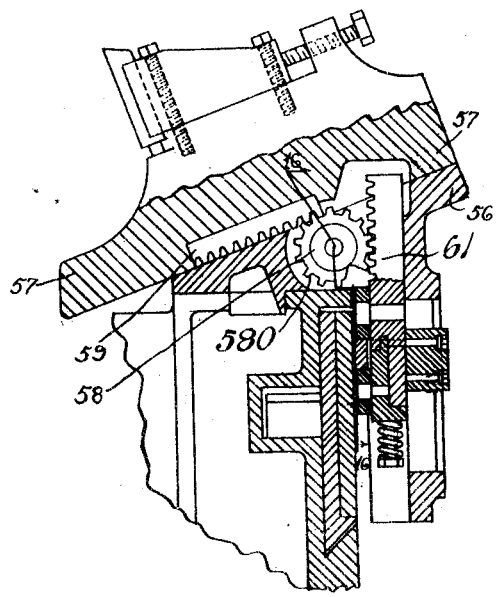
Fig. 15 is a sectional view on line 15—15 of Fig. 1.

The crank 119 is mounted upon the shaft 130. The shaft 130 extends through the front wall 131 of chamber 79. A rearwardly extending web 132 is carried by the front wall 131 and serves as a bearing for the rear ends of the shaft 130 and shaft 133. Within the chamber 79, and disposed upon shaft 130 is revolubly mounted a sleeve 134. The sleeve 134 carries an arm 135. The arm carries an adjustable screw 136, the head of which engages the face 137 of a cam 138 mounted co-axial with the shaft 133. A roller arm 139 is revolubly mounted on shaft 130 and carries a roller 140 intermediate its ends. The roller 140 engages the periphery of a notched disc 141 pinned to the shaft 142. The shaft 142 is co-axial with the shaft 133 and has a revoluble bearing upon the shaft 133. The cam 138 is splined on shaft 142 and may be reciprocated longitudinally of said shaft. Said cam has a clutch member 143 formed on it, said clutch member being complementary to a clutch member 144 formed on the forward end of the shaft 133. The cam 138 is provided with a rearwardly projecting lug 145, said lug extending from the face 137 of the cam, and adapted to engage the head of the screw 136. The relationship of the screw 136 and the cam 138 is such, that when the lug 145 on the cam rides upon the head of the screw 136, the clutch elements 143 and 144 are disengaged, and when the screw is disengaged from engagement upon the lug 145, the cam 138 may be moved rearwardly for bringing the clutch elements 143 and 144 into engagement. A spring 146 carried within a suitable bore provided in cam 138 yieldingly retains the plug 147 in engagement upon the rear face of the disc 141. The spring 146 yieldingly resists disengagement of the clutch members 143 and 144. The sleeve 134 carries laterally extending brackets 148 and 149. The brackets support a pin 150 that provides a pivotal mounting for a bell crank lever 151. By reference to Fig. 6, it will be observed that the bell crank lever is provided at the free end of its upper arm, with a depending lug 152 that may lodge in a recess 153 formed in the shaft 130. A shoulder 154 defines one portion of the recess 153 and the lug 152 is adapted to engage said shoulder.

The structure just described, is utilized for providing a temporary connection between the shaft 130 and the sleeve 134. This temporary connection is utilized, for moving the sleeve 134 with the shaft 130 when the crank 119 is actuated by means of the link 118. Means are provided for releasing the sleeve 134 from the shaft 130 so that the screw 136 is automatically returned to its normal position, regardless of whether or not the crank 119 is released. The means for releasing the sleeve 134 from the shaft 130 comprises a lug 155 carried by the cam 138, and which lug is adapted to engage the leg 156 of the bell crank lever 151 and to thereby disengage the lug 152 from the shaft 130. A spring 157 yieldingly resists movement of the sleeve 134, wherefore when the sleeve is released from the shaft 130, the spring 157 returns the sleeve to its normal position, with the screw 136 lying adjacent face 137 of the cam 138, and in position for engagement upon the lug 145 formed on the rear face of the cam 138, when said lug 145 has made one revolution about its axis.

Figure 3:
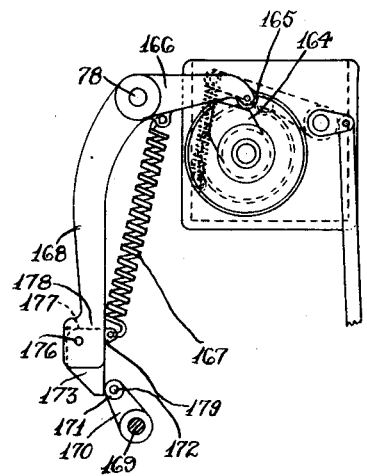
Fig. 3 is a sectional view on line 3—3 of Fig. 2.

The disc 141 is provided in its periphery with a notch 158 in which the roller 140 may lodge. The notch is so positioned that the roller 140 is lodged in the notch when the head of the screw 136 rests upon the rearmost portion or point of the lug 145. A spring 1590 yieldingly retains the roller 140 in engagement upon the periphery of the disc 141, and this spring serves to impart sufficient rotatory motion to the disc 141 and to the shaft 142, to assure sufficient movement of the cam 138 so as to lodge the head of the screw 136 in its normal position upon the lug 145, although the clutch elements 143 and 144, associated with the cam 138 and with shaft 133 are disengaged. The forward end of the disc 141 has formed on it a clutch element 159 that may engage a complementary clutch element 160 formed on the collar 161 mounted on shaft 142. A spring 162 associated with the collar 161 and nut 163 mounted on shaft 142, yieldingly retains the clutch elements 159 and 160 in engagement. The spring 162 permits longitudinal movement of the collar 161 relative to the shaft 142 for rotary adjustment of the clutch members 159 and 160. The collar 161 carries a radially extending lug 164. The object of adjusting the clutch members 159 and 160 is to position the radial lug at various relative positions to the other elements associated with the structure disclosed in Fig. 7. The free end of the lug 164 is tapered or pointed, see Fig. 3. The tapering sides formed on the free end of the lug 164 are adapted to engage a roller 165 carried by the free end of a bell crank lever 166, mounted on shaft 78. The depending arm 168 of the lever 166 is disposed adjacent the shaft 169 associated with the switch box 52, and which shaft extends through said switch box and carries at its forward end the crank 54, see Fig. 14. The rear end of the shaft 169 carries a crank 170. The crank 170 carries a pin 172, upon which pin is mounted a roller 171. The roller 171 is adapted to engage a lug 173 carried by the lower and free end of the arm 168 of the lever 166. The lower end of the arm 168 is bifurcated and the lug 173 is disposed between the branches 174 and 175 thereof. A pivot 176 provides a mounting for the lug upon said branches. The upper face 177 of the lug 173 is normally held in abutment upon the yoke 178 formed at the junction of the branches 174 and 175 whereby to limit the counter-clockwise movement of the lug 173 about its pivot 176. A spring 167 has its lower end attached to a projection 179 on the lug 173 and has its upper end secured to the upper arm of the lever 166, whereby movement of the lug 173 about its pivot 176 in a clockwise direction is yieldingly resisted. The spring 167 is given sufficient tension that when the lever 166 is moved in a counter-clockwise direction the crank 170 and the shaft 169 will normally move therewith. Should the crank 170 and the shaft 169 be locked against movement because of the various interlocking mechanisms previously described, the lever 166 would still be free to move, whereby to disengage the clutch associated with the pulley 70 while the lug 173 would move about its pivotal mounting 176.

By reference to Figs. 5 and 7, it will be observed that the shaft 133 has mounted on it a spiral gear 180, which gear engages a spiral gear 181 mounted on the shaft or spindle 85. From the foregoing it will be evident that the mechanisms described in the preceding paragraph will retain a synchronized relationship to the spindle 85.

Figure 2:
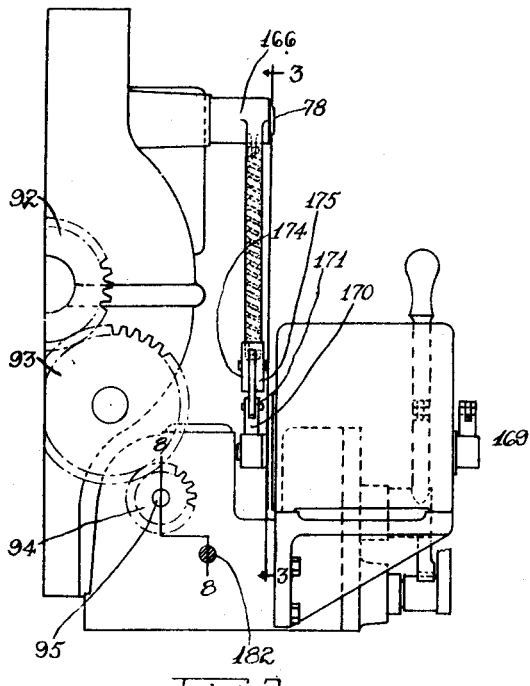
Fig. 2 is an enlarged fragmental end view on line 2—2 of Fig. 1.

The operation of my device is as follows:

When work has been mounted between the spindles of the respective power heads, assuming that all of the parts are in their normal position, the operator would move hand lever 86 thereby operating the clutch associated with the pulley 70, to transmit power to the driving heads. In the normal or beginning position, the slide or carriage 25, see Fig. 1, would be at the right hand end of the way 24. In order that the clutch associated with the pulley 70 and hereafter referred to as the primary clutch, may transmit motion to the shaft 72, the switch lever 42 must be in its neutral position, as shown in Fig. 14. The auxiliary motor 33 would therefore be inoperative. Power would be transmitted from shaft 72 to spindle 85 by way of the train of gears and shafts previously described, and from spindle 85, by way of the train of gears disclosed in Figs. 2 and 8, to tube shaft 32 associated with the motor shaft 182. In order to transmit power to the tube shaft 32 whereby to feed the tools, the clutch members 99 and 100 must be brought into driving engagement by actuating the hand lever 107. Power from shaft 32 would be transmitted through the worm and worm wheel disclosed in Fig. 8, to the transverse shaft 26 and from the shaft 26, through the pinions carried at its ends to the racks associated with the slides thereby moving the slides longitudinally of the lathe bed. The movement of the slides and of the cam bars associated with the slides in turn actuates the tool supports for causing the tools to perform their work. Motion from the spindle 85 is transmitted to the spindle stop mechanism by way of spiral gears 180 and 181. At this time however, the spindle stop mechanism, beyond shaft 133, is inoperative for the reason that the clutch member 143 is out of engagement with the clutch member 144. As previously explained, the bar or the shaft 110 associated with the hand lever 107 is projected downwardly when the clutch members 99 and 100 are brought into engagement, so that when the dog 112 carried by the slide 25 engages said downwardly extending shaft 110, said shaft is moved upwardly and the lever 107 is returned to its normal or neutral position, thereby disengaging the clutch members 99 and 100 and bringing the carriage 25 to rest. The movement of the lever 107 to its normal position brings the spindle stop mechanism into operation. This is effected by the movement of lever 107 to its normal position actuating the shaft 130 and sleeve 134 mounted on shaft 130, by means of the lever 116 and link 118, as previously explained. When the headed screw 136 is withdrawn from engagement with the cam 138, the spring 146 brings the clutch members 143 and 144 into driving engagement, whereupon the sleeve 134 is released from the shaft 130 by the engagement of the lug 155 upon the bell crank lever 151, as previously explained. The shafts 133 and 142 continue to move with one another until the headed screw again rides upon the rearmost portion of the lug 145. During the rotation of shaft 142, the radial lug 164 associated with sleeve 161, is brought into engagement with bell crank lever 166 and trips same. This tripping of the lever 166 serves to both disengage the elements of the primary clutch and to actuate the shaft 169 associated with the switch box. The hand lever 42 is also actuated at the time the lever 166 is tripped. The movement of the hand lever 42 serves to extend the shaft 48 into the path of one of the dogs 51. The circuit controlled by the switch associated with the switch box is closed by this movement of shaft 169 and the secondary motor 33 becomes operative and returns the slide or carriage 25 toward its normal position. When the dog 51 engages the downwardly projecting shaft 48, the shaft 48 is moved to its normal position and breaks the circuit embracing the motor 33, whereupon the slide 25 comes to rest in its normal position. The cooperation of the various interlocking and fool-proof devices have been explained in the description of the device. It will now be readily evident that the primary clutch members cannot be brought into driving engagement while the secondary motor is operated, and vice versa.

It will also be evident that the various mechanisms are precluded from being operated in any manner that will cause damage or injury to any of the parts. It will be evident that after the slide 25 has come to rest, the work may be revolved for a determinable period of time controlled by the adjustment of the spindle stop mechanism, whereby to permit touching up of the work, before the carriage is returned to its normal position, and before the spindle is brought to rest.

What I claim is:

1. The combination with a lathe, of means for automatically moving the cutting tools thereof into and from operation upon the work, for returning the tools to their original position, for continuing the movement of the work for a determinable period after the tools have completed their normal work and for stopping the lathe, and means for interlocking said means for precluding accidental operation of any parts thereof.

2. The combination with a lathe, of tools for operation on work moving with a spindle of the lathe, power actuated means for moving the tools from a beginning position into the work for operation thereon, auxiliary means for returning the tools to their beginning position upon completion of the work associated with the spindle, means for revolving the spindle of the lathe, and means to render the spindle revolving means inoperative upon the spindle at determinable periods after the tools have concluded operation upon the work.

3. The combination with a lathe comprising a revolving spindle adapted to move work, tool holders for operation upon the work, means for revolving the spindle, and means for moving the tool holders relative to work associated with the spindle, the tool holders being adapted to assume a normal or beginning position, of means for arresting relative movement of the tool holders, means for rendering a determinable continuity of rotation of the spindle and for then rendering the means for revolving the spindle inoperative upon the spindle, and auxiliary means for then returning the tool holders to their beginning or normal position.

4. In a lathe the combination of a bed having a way extending longitudinally thereof, a slide reciprocally mounted in the way, a carriage mounted on the bed, a tool holder reciprocally mounted on the carriage, a tool associated with the tool holder, a connection between the tool holder and the slide whereby movement of the slide in the way serves to move the tool holder relative to the carriage, a spindle, a drive shaft, a severable driving connection between the drive shaft and the spindle, a severable connection between the slide and the drive shaft whereby the slide may be actuated in its way by means of the drive shaft, an auxiliary power actuated means for moving the slide in the way, interlocking means for precluding simultaneous power transmission to the slide from the drive shaft and the auxiliary power actuated means, and means to render the drive shaft inoperative upon the slide and to render the auxiliary drive means operative upon the slide after the tool associated with the tool holder has completed its work whereby to reverse the movement of the slide for withdrawing the tool holder and tool from the work.

5. In a lathe the combination of a bed having a way extending longitudinally thereof, a slide reciprocally mounted in the way, a carriage mounted on the bed, a tool holder reciprocally mounted on the carriage, a tool associated with the tool holder, a connection between the tool holder and the slide whereby movement of the slide in the way serves to move the tool holder relative to the carriage, a spindle, a drive shaft, a severable driving connection between the drive shaft and the spindle, a severable connection between the slide and the drive shaft whereby the slide may be actuated in its way by means of the drive shaft, an auxiliary power actuated means for moving the slide in the way, interlocking means for precluding simultaneous power transmission to the slide from the drive shaft and the auxiliary power actuated means, means to render the drive shaft inoperative upon the slide and to render the auxiliary drive means operative upon the slide after the tool associated with the tool holder has completed its work whereby to reverse the movement of the slide for withdrawing the tool holder and tool from the work, and means to sever the driving connection between the drive shaft and the spindle.

6. In a lathe of the class described the combination of a primary driving means, a spindle, a severable driving connection between the spindle and the primary driving means, a slide reciprocally mounted on the lathe, a severable driving connection between the slide and the primary driving means, an auxiliary driving means, a severable driving connection between the auxiliary driving means and slide, means for precluding either severable driving connection associated with the slide from transmitting power to the slide when the other of said severable drive connections is operative for transmitting motion to said slide, a tool reciprocally mounted on the lathe, a connection between the tool and the slide whereby to convert movement of the slide into movement of the tool, means associated with the slide for severing the driving connection between the primary driving means and the spindle, for severing the driving connection between the primary driving means and the slide, for establishing a driving connection between the auxiliary driving means and the slide and for then severing the driving connection between the auxiliary driving means and the slide.

7. In a lathe of the class described the combination of a primary driving means, a spindle, a severable driving connection between the spindle and the primary driving means, a slide reciprocally mounted on the lathe, a severable driving connection between the slide and the primary driving means, an auxiliary driving means, a severable driving connection between the auxiliary driving means and slide, means for precluding either severable driving connection associated with the slide from transmitting power to the slide when the other of said severable drive connections is operative for transmitting motion to said slide, a tool reciprocally mounted on the lathe, a connection between the tool and the slide whereby to convert movement of the slide into movement of the tool, means associated with the slide for severing the driving connection between the primary driving means and the spindle, for severing the driving connection between the primary driving means and the slide, for establishing a driving connection between the auxiliary driving means and the slide and for then severing the driving connection between the auxiliary driving means and the slide, the connection between the slide and the tool being adapted to temporarily render the tool quiescent prior to the severence of the driving connection between the primary driving means and the spindle whereby to permit a determinable movement of the spindle prior to quiescence thereof.

8. In a lathe of the class described the combination of a primary driving means, a spindle, a severable driving connection between the spindle and the primary driving means, a slide reciprocally mounted on the lathe, a severable driving connection between the slide and the primary driving means, a normally inoperative auxiliary driving means, a severable driving connection between the auxiliary driving means and slide, means for precluding either severable driving connection associated with the slide from transmitting power to the slide when the other of said severable drive connections is operative for transmitting motion to said slide, a tool reciprocally mounted on the lathe, a connection between the tool and the slide whereby to convert movement of the slide into movement of the tool, means controlled by the slide for severing the driving connection between the primary driving means and the spindle, for severing the driving connection between the primary driving means and the slide, for rendering the auxiliary driving means operative, and for then rendering the auxiliary driving means again inoperative.

9. In a lathe of the class described the combination of a primary driving means, a spindle, a severable driving connection between the spindle and the primary driving means, a slide reciprocally mounted on the lathe, a severable driving connection between the slide and the primary driving means, a normally inoperative auxiliary driving means, a severable driving connection between the auxiliary driving means and slide, means for precluding either severable driving connection associated with the slide from transmitting power to the slide when the other of said severable drive connections is operative for transmitting motion to said slide, a tool reciprocally mounted on the lathe, a connection between the tool and the slide whereby to convert movement of the slide into movement of the tool, means controlled by the slide for severing the driving connection between the primary driving means and the spindle, for rendering the driving connection between the auxiliary driving means operative, and for then rendering the auxiliary driving means again inoperative, the connection between the slide and tool being adapted to temporarily render the tool quiescent prior to the severence of the driving connection between the primary driving means and the spindle whereby to permit a determinable movement of the spindle prior to quiescence thereof.

10. The combination with a lathe comprising a revolving spindle adapted to move work, tool holders for operation upon the work, means for revolving the spindle, and means for moving the tool holders relative to work associated with the spindle, the tool holders being adapted to assume a normal or beginning position, of means for arresting relative movement of the tool holders, means for rendering a determinable continuity of rotation of the spindle and for then rendering the means for revolving the spindle inoperative upon the spindle, auxiliary means for then returning the tool holders to their beginning or normal position, and interlocking means for precluding operation of the enumerated means in other than their predetermined order.

In testimony whereof, I have hereunto subscribed my name this 28th day of May, 1924.

WILLIAM F. GROENE.